United States Patent
Semotiuk et al.

(12)

(10) Patent No.: US 6,474,907 B2
(45) Date of Patent: Nov. 5, 2002

(54) ENVIRONMENTALLY COMPATIBLE ARCHWAY FOR ROAD BUILDING

(76) Inventors: Robert A. Semotiuk, 2633 Tweedsmuir Avenue, Prince George (CA), V2N 1E8; Barry C. Nybo, 35110 Marshall Road, Abbotsford, British Columbia (CA), V3G 2B8

( * ) Notice: Subject to any disclaimer, the term of this patent is extended or adjusted under 35 U.S.C. 154(b) by 0 days.

(21) Appl. No.: 09/814,736

(22) Filed: Mar. 23, 2001

(65) Prior Publication Data

US 2002/0076280 A1 Jun. 20, 2002

(30) Foreign Application Priority Data

Dec. 13, 2000 (CA) .............................................. 2328096

(51) Int. Cl.$^7$ ............................ F16L 23/00; E01F 5/00; E02D 29/00
(52) U.S. Cl. ........................ 405/126; 405/132; 403/338
(58) Field of Search ................................ 405/124–126, 405/132; 403/335–338; 138/120

(56) References Cited

U.S. PATENT DOCUMENTS

| | | | | |
|---|---|---|---|---|
| 832,017 A | * | 9/1906 | Hummel .................... | 405/126 |
| 838,263 A | * | 12/1906 | Moore et al. ............... | 138/170 |
| 1,197,966 A | * | 9/1916 | Sweney ..................... | 138/100 |
| 4,141,666 A | * | 2/1979 | DeGraff ..................... | 405/126 |
| 4,318,635 A | * | 3/1982 | Gurtner et al. ............. | 405/126 |
| 4,650,369 A | * | 3/1987 | Thomas et al. ............. | 405/126 |
| 4,693,634 A | * | 9/1987 | Chiaves ..................... | 405/124 |
| 5,326,191 A | * | 7/1994 | Wilson et al. .............. | 405/124 |
| 5,704,509 A | * | 1/1998 | Rosenkrantz ............... | 220/216 |
| 6,161,342 A | * | 12/2000 | Barbier et al. .............. | 405/124 |

FOREIGN PATENT DOCUMENTS

JP         159117 A    *   6/2001   ............. E02B/5/02

OTHER PUBLICATIONS

Harper, D.J. and Quickley, J.T. 2000. No Net Loss of Fish Habitat: An Audit of Forest Road Crossings of Fish–Bearing Streams in British Columbia, 1996–1999. *Canadian Technical Report of Fish and Aquatic Sciences* 2319, 2000.

Federal Government of Canada, Dept. of Fisheries and Oceans, Habitat Management and Environmental Science, Habitat Management Branch, Decision Framework for the Determination and Authorization of Harmful Alterations, Disruption or Destruction of Fish Habitat (H.A.D.D.), 1998.

Partington, M. Non–Corrugated Plastic Arches: A New Choice for Stream Crossings. *Forest Engineering Research Institute of Canada—Eastern Division*, Dec., 1999.

Soleno Inc. advertisement, *Canadian Forest Industries*, Nov./Dec., 1999.

Promotional literature and letter from D.S. Cunliffe Consulting Services re Sanders Environmental Culverts, Aug. 21, 2000.

Information re Mini–Span Bridges from website www.armtec.com.

Print–out re portable bridges from Soleno Inc. website, www.soleno.com.

Soleno Inc. advertisement, *Canadian Forest Industries*, Sep., 2000.

* cited by examiner

Primary Examiner—Thomas B. Will
Assistant Examiner—Tara L. Mayo
(74) Attorney, Agent, or Firm—Oyen Wiggs Green & Mutala (57) ABSTRACT

A floating link archway system which is useful for building access roads, such as logging roads and secondary roads in wilderness areas that include waterways such as streams and creeks, without causing significant adverse impact to sensitive environment. The archway system is constructed of a plurality of modules having a semi-cylindrical configuration with flanges at each end, an integral semicircular upstanding reinforcing rib between the flanges, footing contact areas at the base of each side of the semi-cylindrical body, and protective caps which cover the entirety of adjacent flanges of pairs of adjacent modules and thus enable the modules to move independently of one another.

13 Claims, 5 Drawing Sheets

ENVIRONMENTALLY COMPATIBLE ARCHWAY FOR ROAD BUILDING

TECHNICAL FIELD

This invention relates to a novel archway apparatus which is useful for building in wilderness areas, access roads, such as logging roads and secondary roads, over waterways such as streams and creeks, while causing little or not impact to sensitive wilderness environment.

BACKGROUND

Typical road building processes in wilderness areas require the use of culverts in watershed areas to enable water to flow under the roadways built in those areas. Such culverts are typically constructed of corrugated steel pipe (CSP) or polyethylene-(HDPE) pipe. Installing these culverts requires that the creek or stream bed be disturbed or altered. This silt disruption upsets the natural habitat of the creek bed and causes harmful silt to move downstream. This can damage sensitive fish (including salmon) spawning beds. Once a culvert is installed, further problems arise. Water flowing through the confined interior of the culvert has higher than normal velocity. This occurs particularly during high water levels. Water flowing from the outlet (downstream) side of the culvert is turbulent and causes erosion in the creek bed area downstream of the culvert. Furthermore, since movement of the water through the culvert is restricted, water tends to back-up on the inlet (upstream) side of the culvert. This can cause erosion on the banks upstream of the culvert.

The use of corrugated steel pipe (CSP) in building road culverts has been widespread. Such culverts rust over time, thereby causing an unnatural form of iron oxide pollution in the streams. CSP pipes are usually galvanized with zinc to reduce rusting. However, the zinc, in itself, as a natural process of erosion, releases a certain amount of zinc metal toxins to the waterways. This is in addition to the rust that is imposed on the environment after the zinc galvanization has corroded away. In many cases, old rusted CSP installations deteriorate structurally in strength to a point where they must be replaced. Replacement further disturbs the creek and stream beds.

Over the years, numerous attempts have been made to avert such damage to creek and stream beds. Furthermore, there has been increasing pressure to preserve the environment and provide a managed balance between industrial and recreation use and conservation of natural resources. The Federal Department of Fisheries and Oceans (D.F.O.) and the British Columbia Ministry of Environment are in the process of changing their policy so as not to allow the replacement of CSP culverts with any product that disrupts the stream or creek beds. See a complete report of these requirements: Harper, D.J. and Quigley, J. T. 2000. No Net Loss of Fish Habitat: An Audit of Forest Road Crossings of Fish-Bearing Streams in British Columbia, 1996–1999. *Canadian Technical Report of Fish and Aquatic Sciences* 2319 (a 44 page report identified as CTR 2319).

Alternatives such as suspended wooden trestle bridges, arches of rolled plate steel, and culverts of HDPE cut in half, and, of late, a material similar to CSP, have been used to overcome the typical problems associated with road building in environmentally sensitive areas. However, some of these alternative systems are costly and span distances are limited. Steel structures of any design suffer from the problem of rusting and thus contamination. In most cases, it is necessary to use heavy equipment for placement of the new heavy structures. This causes further disruption.

The Federal Government of Canada has embarked on a program known as "Harmful Alterations, Disruption or Destruction of Fish Habitat"(H.A.D.D.), 1998.

A search of the art reveals that different culvert attempts and designs have been published. A recent design is the use of ¾" plate steel that has been developed by Sanders & Company Contracting Ltd., sold under the trade-mark ENVIRO-PIPES. A simple calculation of the weight of ½" plate steel confirms that a mobile crane is required to place this plate structure in a creek bed or remove this structure from the creek bed once the road requires decommissioning. Furthermore, a structure of this size would require a low bed and truck for transport to and from the installation site.

Another product on the market comprises a non-corrugated plastic arch. This arch is discussed in the December 1999 issue of *Forest Engineering Research Institute of Canada—Eastern Division.* This product is manufactured by KWH Pipe (Canada) Ltd. and is known as the KWH Arch. This product is available to a maximum diameter of 2.3 meters. Once the pipe is cut in half, it expands to 24% larger than its original diameter. Thus the structure becomes somewhat less than half-circle. Since there are no footings along the edges that contact the ground, and with the tension placed on the structure upon installation, the product would tend to sink or be depressed into the banks of the creek bed. This therefore causes further deflection of the pipe from its original less than half circle configuration and compromises the integrity of the structure. There is a real possibility of collapse of the structure under load.

A further culvert product is supplied by Armtec Construction Products. Their product is called a "Mini Span Bridge". The Mini Span I has a maximum width of 1800 mm. The Mini Span is brought to the site as a one-piece assembled structure. The Mini Span II is available to a width of 3660 mm, making transport of this structure difficult and costly. Required footing and structural support demands trained installers and heavy equipment for installation. This product is also made of galvanized material and other steel components that require treatment to avoid rusting.

An article by Soleno Inc. in the November/December 1999 issue of the *Canadian Forest Industries* describes a product referred to as "SolArc". Installation of the SolArc product requires 8 to 10 cubic meters of logs (one load) to use as backfill. This is most likely required to avoid collapse of the structure under normal use as a crossing. Great difficulty would be encountered removing these logs and structure during road decommissioning. It would be difficult to avoid disturbing the creek bed with falling debris. Furthermore, the footings that are part of the SolArc structure would reduce the area of flow of the water.

SUMMARY OF INVENTION

The invention is directed to an environmentally compatible archway module for creek or stream construction comprising: (a) a curved body; (b) a first flange on a first end of the body; (c) a second flange on a second end of the body; (d) a first footing contact area at the base of a first side of the body; (e) a second footing contact area at the base of a second side of the body; and (f) a reinforcing member in a region of the body between the first flange and the second flange.

The curved body can be semi-cylindrical, the first and second flanges can have bolt holes therein, the first and second footing contact areas can be semi-cylindrical and concave, and the exteriors of the first and second footing contact areas can be planar.

The module can include a semi-circular protective cap for fitting over adjacent flanges when two archway modules are placed adjacent one another. The archway can include bolts securing the flanges of adjacent modules together. In one embodiment, the first and second flanges may be parallel to one another. In an alternative embodiment, the first and second flanges may be at an angle with one another.

There can be at least three modules and some adjacent flanges can be bolted together, and some adjacent flanges not bolted together, but having protective caps over the flanges.

The archway can include a first headwall at a first end of the adjoining modules and a second headwall at a second end of the adjoining modules. The first and second headwalls can be planar and congruent with the first and second flanges and can be bolted to adjacent flanges of the proximate modules.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
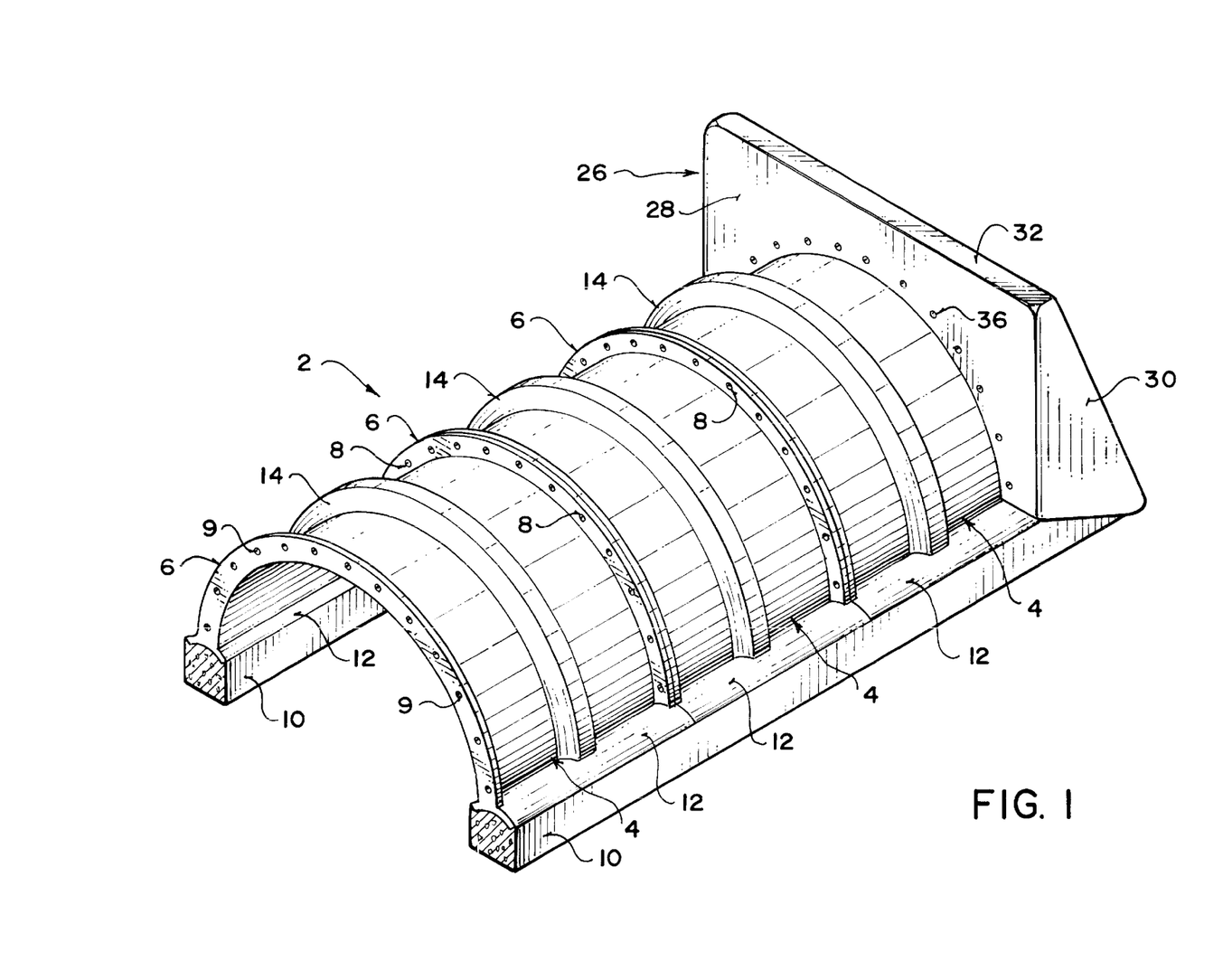
FIG. 1 illustrates an isometric view of the environmentally compatible archway constructed of a series of adjoining and bolted arched modules with a headwall at the far end.

Referring to the drawings, FIG. 1 illustrates an isometric view of an "Enviro-Span" archway assembled from a series of adjoining bolted modules and a headwall at the far end. The assembled archway 2 illustrated in FIG. 1 is constructed of an end to end series of three semicircular ribbed modules 4 bolted together at adjoining flanges 6 by bolts 8. It is understood that as many modules can be bolted together in series, as is required to accommodate a specific archway site. The bases 12 of the adjoining modules 4, as shown in FIG. 1, rest on footings 10. The footings 10 shown in FIG. 1 are concrete, but it is understood that the footings can be logs cut on site, or hauled in, or some other suitable foundation.

The assembled archway illustrated in FIG. 1 has each module 4 bolted together by bolts 8 at adjacent flanges 6. Also, while only one headwall is shown in FIG. 1, it will be understood that both the upstream and downstream ends of the assembled archway 2 have a headwall generally constructed of fibreglass, or a cement/fibreglass composite (see FIGS. 8 to 10). The headwalls act somewhat like dikes and prevent dirt and gravel from the roadway spilling over the edges of the assembled archway 2 and into the stream. The flanges 6 have bolt holes 9 pre-drilled through the end flange 6 (see the front flange 6). The interior flanges being bolted together show bolts 8. FIG. 1 depicts a bolted assembly for a permanent installation. The two parallel bases 12 are flat to accommodate the two parallel horizontal cement poured footings 10. Each archway module 2 is bolted together in adjoining sections in appropriate number to achieve the width of the crossing. The two headwalls (see FIGS. 8 to 10) are attached to the inner side of the flanged ends of the inlet and outlet side of the archway 2. Once installed, the "Enviro-Span" archway 2 is ready for back-filling according to conventional back-filling procedures as provided in any road building manual. In addition to any back-filling procedures, it is recommended that a geo-synthetic road building filter cloth be installed over the top surface of the entire archway 2 after assembly to avoid passage of silt from any potential water seepage through the backfilled portion of the crossing. This problem would be more prevalent when the crossing is of lower grade than the roadway thereby causing water to flow into the crossing area.

Figure 2:
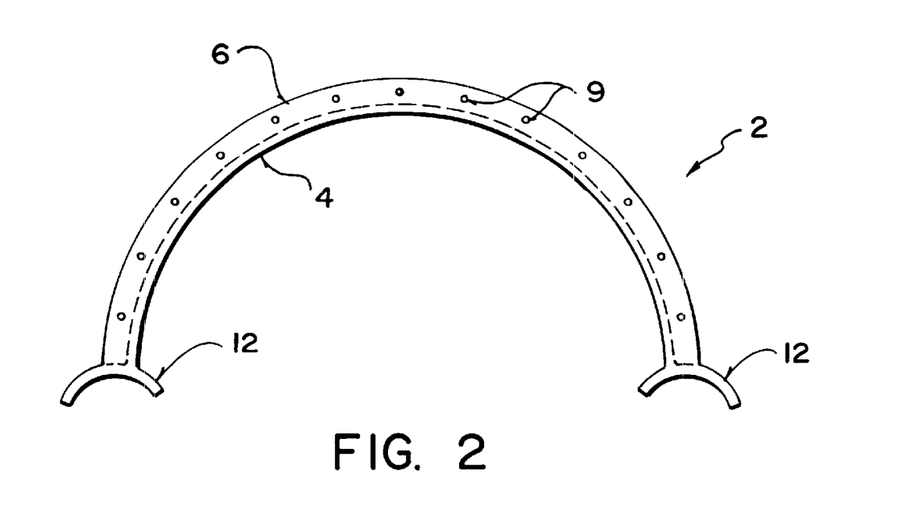
FIG. 2 illustrates an end view of an archway module.

FIG. 2 illustrates an end view of the "Enviro-Span" archway module 2 with bases 12 suitable for mounting on a curved footing such as a log. The curved "footing support" area 12 at the respective bottoms of the archway is designed to be affixed to a log of approximately 12 in. in diameter. The base 12 of each side of the semicircular module 2 can have holes therein (not visible) for securing the "footing support" 12 to the log base (not shown). These holes are factory predrilled, thereby reducing the number of tools required on the installation site. The reference number 4 shown in FIG. 2 indicates the solid portion of the curved structure (body) of the archway 2. Reference number 6 depicts the raised flange portion of the module structure with bolt holes 9 drilled therein at periodic intervals. Each flange end 6 of the module 2 has an identical bolt pattern thereby enabling ease of assembly. The archway module 2 is constructed of fibreglass or cement/fibreglass composite, with interior reinforcing ribs 14 (see FIG. 3) so that the archway module 2 can stand up to the weight of heavy equipment passing over it.

Figure 3:
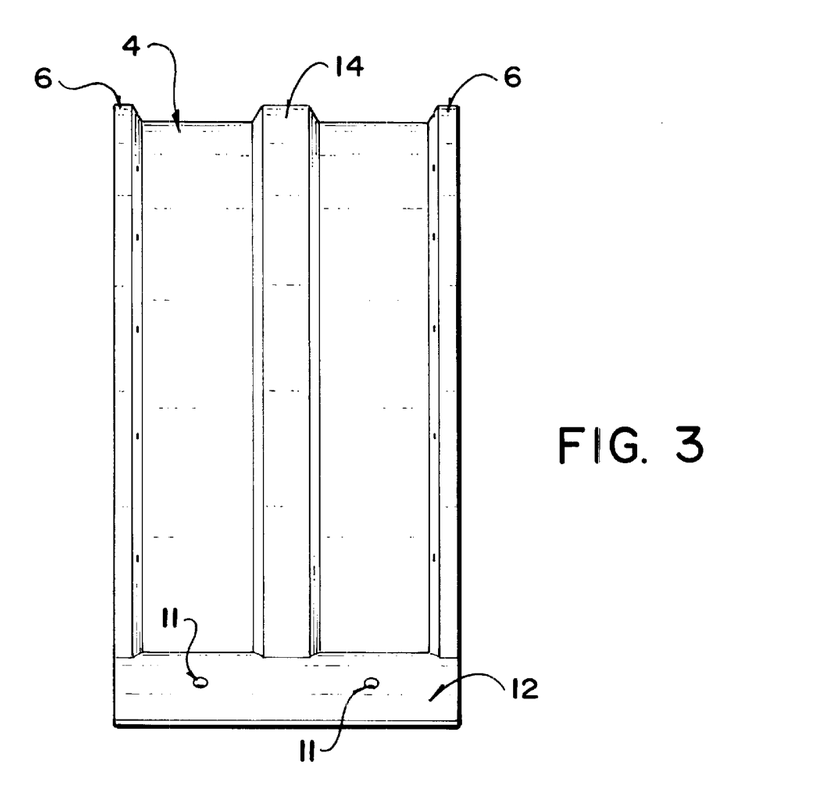
FIG. 3 illustrates an elevation of the archway module.

FIG. 3 illustrates an elevation of the body structure of the archway module 2. Module 2 will typically be 4 ft. wide (or at least of manageable size) measuring from left flange 6 to right flange 6. The curved footing 12 can have holes 11 drilled therein and is attached to the base of curved semicylindrical body 4. The flanged ribs 6 on the left and right sides of module 2 are raised. Holes (not visible) are also predrilled at standard locations at the factory on flanges 6 for ready on-site assembly. Reference number 14 denotes the centre support rib which reinforces the archway body 4. This rib 14, along with the two flanges 6, adds radial strength to the archway 2 and enables the archway 2 to withstand vehicle loads. The sizes of spans across creeks and streams and the number of modules 2 that must be joined together in series will vary according to the specific road requirements.

In areas requiring temporary assembly, for example, up to three years, or depending on local regulations or circumstances, a combination of lengths of logs 25 cm to 30 cm (10 to 12 inches) of approximately 1.3 to 3.5 meters (4 ft. to 10 ft. ) long can be used as footings. These allow two "Enviro-Span" archway modules 2 to be bolted together using the adjacent flanges 6 (the exterior flanges 6 allow the headwall attachment 26 to be secured to the archway). This procedure is followed at the inlet and the outlet of the required archway. One or more 4 ft. interior module sections are then placed between the bolted outlet and inlet sections. These interior modules are left free standing and are not bolted to either the inlet or outlet assemblies. These free-floating sections are supported on their own log footings, or installed on logs that are not straight. They either bend inward or outward, or upwards and downwards. In either case, the parallel logs on the opposing side of the archway span must have the same conformity for proper installation of the archway.

Prior to any installation, approval must be obtained from the government agency that has jurisdiction over the location in which the installation is to be performed. This will include an assessment of any environmental impact that may occur as a result of water levels and soil conditions.

Figure 4:
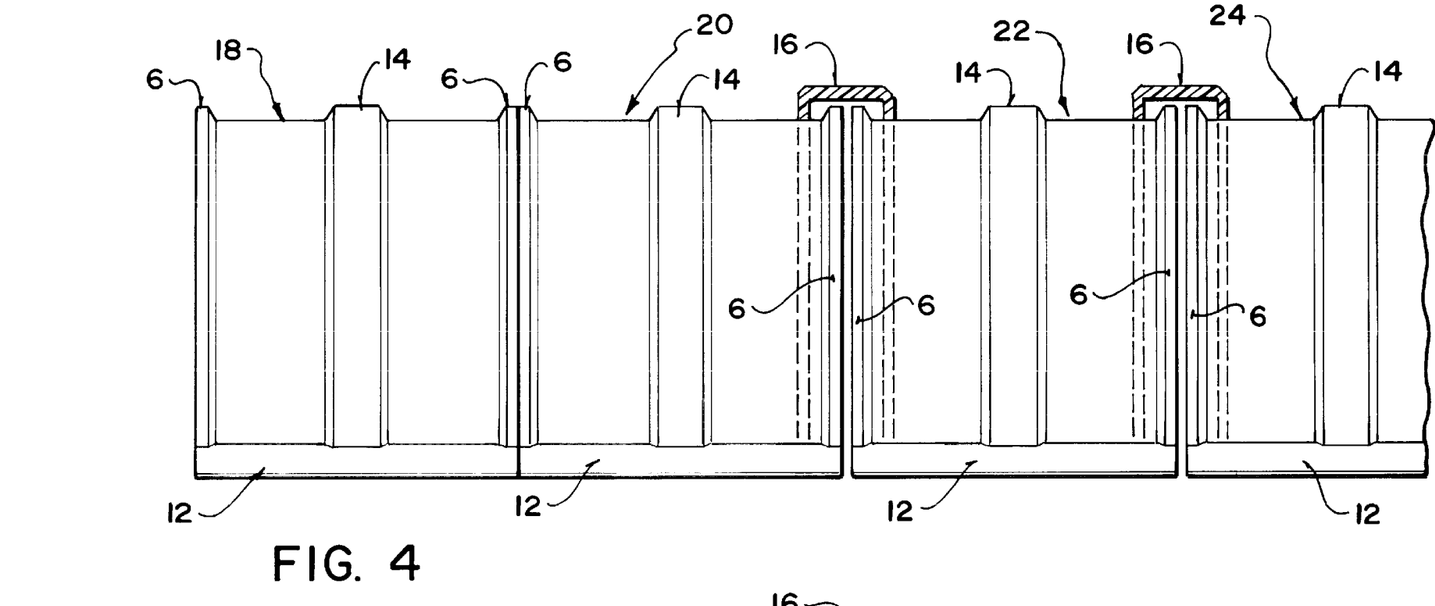
FIG. 4 illustrates an elevation of a plurality of archway modules assembled together in series, some modules being bolted together, and other modules being freely placed.

FIG. 4 illustrates an elevation partial section view of one end of a plurality of culvert modules 2 assembled in the manner discussed above, that is, a combination of bolted and free standing modules. The two left most adjoining modules 18 and 20 are bolted together at the adjacent flanges 6. The interior flanges 6 of the "free-floating" modules 22 and 24 are not bolted together but are instead covered by a pair of arched floating caps 16. The footing areas 12 of the interior modules have respective separate log footings 12 so that slight movement can take place between the adjacent floating modules 22 and 24. This system of "floating" interior modules 22 and 24 enables the overall archway to tolerate any movement that might occur across the span of the crossing. For instance, the road may settle or shift slightly over time. If the overall archway is constructed of modules which are all bolted together, there is a risk that the road shifting may cause the archway to fail. The semicircular floating caps 16 placed over each of the unbolted adjoining flanges of the "Enviro-Span" archway, namely module 20 adjoining module 22, and module 22 adjoining module 24, cover the areas where the adjoining flanges 6 are butted to each other, but are not bolted to each other. A one or two inch space between these non-bolted adjoining flanges 6 is generally appropriate to most situations. The floating caps 16 are held in place by gravity and prevent road dirt from falling through the cracks between the adjoining unbolted flanges 6 and clogging the interior of the archway. The assembled "Enviro-Span" archway 2, as shown in FIG. 4, is fitted with headwalls (not shown) at each end and the entire assembled structure is back-filled according to standard road building procedures. When backfilling, care must be taken not to displace the floating caps.

Figure 5:
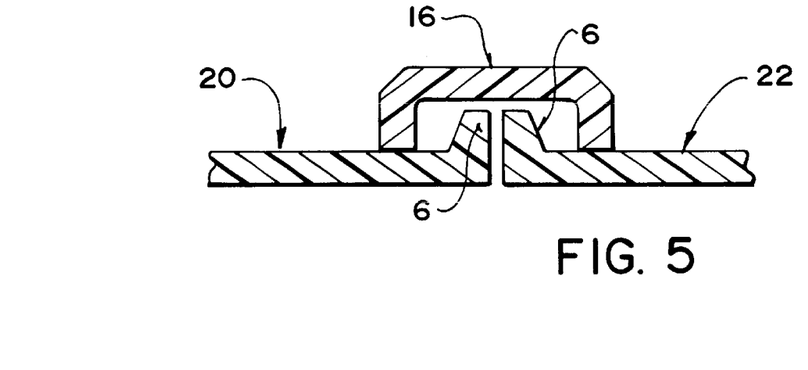
FIG. 5 illustrates a detail section view of a floating cap for covering adjacent flanges of adjoining but not bolted archway modules.
Figure 6:
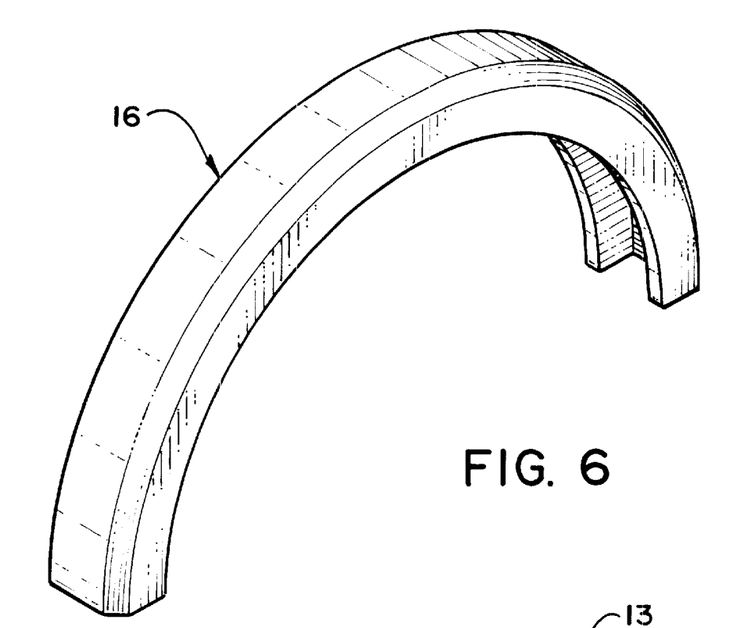
FIG. 6 illustrates an isometric view of a floating cap.

FIG. 5 illustrates a detail section view of the top portion of a floating cap 16 covering an adjoining pair of unbolted flanges 6 of adjacent modules 20 and 22 (see FIG. 4). FIG. 6 illustrates an isometric view of a semicircular hollow floating cap 16. As can be seen, it is formed of a trough-like arch, of a curvature corresponding with but larger than the exterior curve of the flanges 6. The floating cap 16 is of the same curved length as the module 2 so that it extends from the bottom of one side of the module to the bottom 12 of the other side of the module. The floating cap 16 is constructed of cement, fibreglass, or some other suitable material.

The floating cap 16 as seen in FIGS. 4, 5 and 6, can also be used, if required, to provide protection for the bolts 8 used in bolting the flanges 6 from one archway to the flange 6 of the next adjoining archway and also provide additional support to the assembled archways. Prior to any installation of the archway modules, it is necessary to have as footings sufficient lengths of logs which are of similar diameters. It is recommended that the log footings be made approximately two feet longer at each end of the proposed width of the archway. This will allow for gradual sloping of the back fill to the waterway. Log diameters in the range of 30 cm (12') are recommended.

Once the installation location is determined, the logs are placed into position so that the proper span distance is maintained to reflect the diameters of the archway modules. It is recommended to temporarily secure the logs to the ground when the proper span distance is achieved. The logs must contact the concave bases 12 throughout both sides of the archway 2 and for the entire width of the crossing. The logs should be installed as level as possible by either removing high areas of soil with minimal disturbance to the base, or by placing the larger ends of the logs together or the smaller ends together to obtain a level footing.

The log footing base does not have to be of the same plane from one side of the crossing to the opposite side, but must be of the same horizontal plane on both sides of the crossing. In situations where the log footings cannot be made level along the entire width, it is necessary to have a length of approximately ten feet wide for the first two sections of the arch to be bolted together. The same measurement is used for the opposite end. The centre freestanding arch 20 (see FIG. 4) can be floating on its own log footing, but must be of the same footing level as both side arch assemblies 18 and 20. All arches can be fastened to the log base by lag bolts through holes 11. Any space between the bolted arch assemblies 18 and 20 and the single freestanding archway 22 should not exceed 5 cm (2 inches). This can mean that the top of the archway has a 5 cm (2 inch) space or the bottom of the archway has a 5 cm (2 inch) space, but an overall space of a minimum of 2.5 cm (one inch) must be kept between flanges 6. The same measurements are to be followed during installation where one side of the archway has a 5 cm (2 inch) space at the base of one side of the first archway on one sid e of the crossing or a two inch space at the base of the archway on the opposite side of the crossing, notwithstanding that a distance of a minimum of one inch be kept between archway footings 12. If more than 5 cm (2 inches) are observed, further levelling or other footing steps are required to bring them within these guidelines. The floating cap 16 will cover the space between the non-bolted flanges 6 of the archways 20 and 22.

The other two archways on the opposite sides of the floating arch that are to be bolted together, but are not bolted to the floating arch, are then constructed. The same procedure as described previously is followed for levelling and distances between the archways and floating cap installation. A third and fourth floating cap 16 can be placed over the bolted flanges 6 to protect the threads. Finally, the headwalls 26 are installed on the inside of each of the flanges 6 located at the inlet and outlet sides of the overall archway 2. The entire archway 2 is then covered with a road building filter cloth (not shown) and the archway is then backfilled according to standard procedures. Both sides of the archway 2 should be backfilled with equal portions of fill and then compacted. The backfill on the archway 2 should be a minimum of one-third the height of the diameter of the archway. The use of a maximum of ¾" fill next to the archway is recommended. This will avoid damage to the filter cloth. The gravity of the fill on the filter cloth will also hold the floating caps 16 in place and due to the unique design of the archway assembly, will allow movement during any road conditions or weight deflection that is common on any such applications. The floating caps 16 will also provide additional support by making contact with the base 12 of the archways that are attached to the log footings.

In situations where the distances between two archway modules have more than a maximum of 5 cm (2 inches)

separating each other, an intolerable area of unsupported footing for the archway is created. To alleviate this problem in areas where the creek or stream crossing arch is greater than the allowance of the floating archway (within the 5 cm (2 inch) limitation), an offset angled archway rather than an archway module which has parallel end flanges 6 can be used thereby allowing the archway to curve and follow the creek or stream bed if it is curved.

Figure 7:
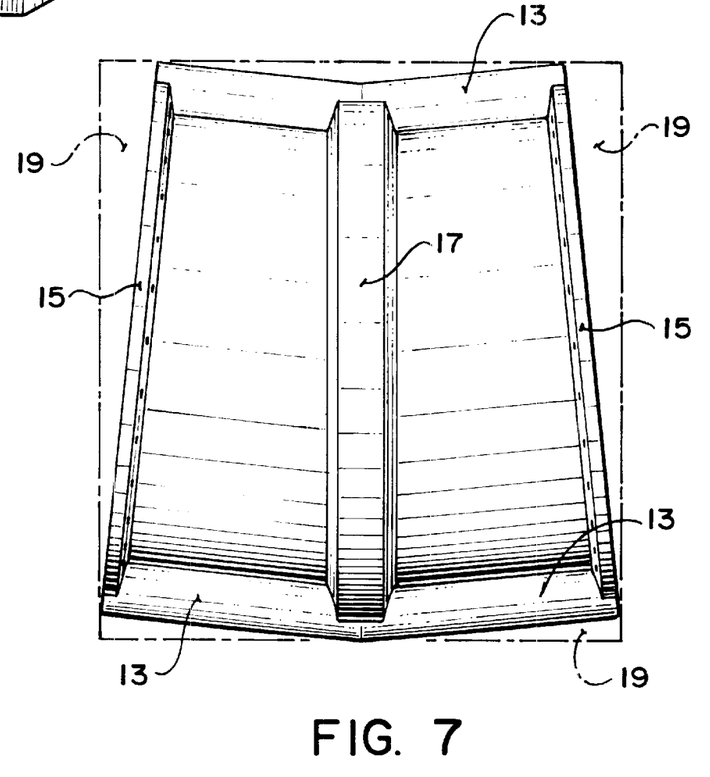
FIG. 7, which is shown on the same sheet as FIGS. 2 and 3, illustrates a plan view of an offset angled archway where the first and second flanges are not parallel.

FIG. 7 illustrates a plan view of an offset angled archway. The unique design of the offset angled archway allows one to construct a curved archway or turn the angled archway end for end in order to change direction of the angle required. (If a crossing is double-angled, that is, the angle changes direction twice between the inlet and the outlet, then all that is required is to put each offset angled archway in an opposite direction when required). This offset angled archway may also assist in bypassing a large obstruction such as a boulder without having to blast or remove the obstruction.

As seen in FIG. 7, the offset angled archway has a pair of footing supports 13, angled flanged ends 15 and centre support 17. The angle from the square or parallel is shown as 19. (Note that any degree of angle may be manufactured to accommodate any installation, not only the angle shown in FIG. 7.)

During installation of an angled archway, the log from the archway module next to the angled archway is placed under log base 13 halfway to the centre support 17. The log from the opposing archway module is installed under the other half of the archway to the centre support 17. In cases where one angled archway is not sufficient, a second angled module may be used next to a first module or a conventional square archway where parallel flanges may be placed to the first angled archway and then a second angled archway may be placed next to it. An angled archway is versatile and may be used in either the inlet or outlet side of the crossing to conform to the contour of the crossing. The angled archway pattern is constructed to have an identical footing base and bolt hole pattern as a standard square archway module thereby making it suitable for attachment to any other component of the archway without creating alignment problems. With a combination of parallel and angled archway modules, virtually any configuration of waterway can be accommodated, including a "c" or "s" shaped archway pattern.

In instances where the installation is "permanent or long term", a cement footing 10 is usually poured. It is recommended to extend the length of the footings 10 approximately two feet beyond each end of the inlet and outlet sides of the archway 2. This will assist in erosion control by enabling a gradual decline of the back fill to the archway. The profile of the top of the cement footing 10 is to match that of the archway base 12 as illustrated in FIG. 1. The module components of the archway 2 are assembled by bolting all sections together at the flanges 6. It is not usually necessary to bolt the archway to the cement footings unless anchor bolts have been inserted into the cement immediately after the pour. The floating caps 16 and filter cloth may be used for the same reasons as using log footings.

Figure 8:
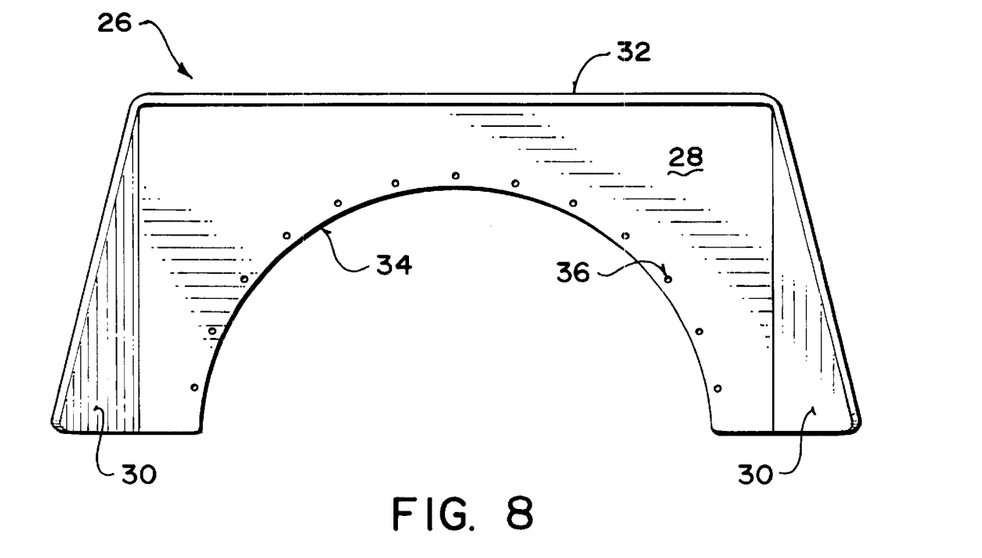
FIG. 8 illustrates a front view of a headwall.
Figure 9:
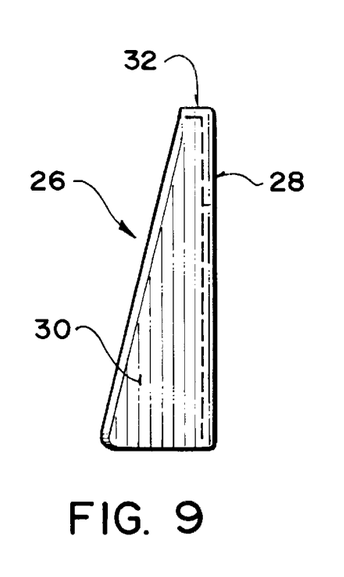
FIG. 9 illustrates a side view of a headwall.
Figure 10:
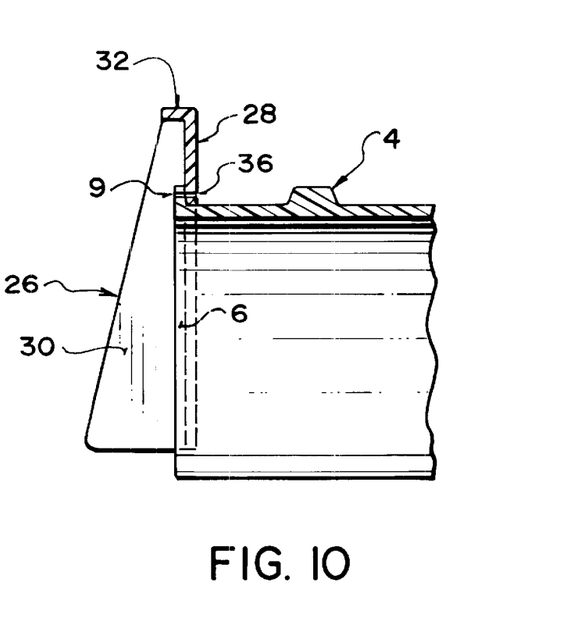
FIG. 10 illustrates a detail of a headwall connected to a flanged end of an archway module.

FIGS. 8, 9 and 10 illustrate the details of the headwall. FIG. 8 illustrates an elevation of the headwall 26. The headwall 26 is constructed of a flat surface 28 with two side supports 30 and a top ledge 32. The two side supports 30 attached to the vertical flat surface 28 providing vertical support for the headwall 26. Side supports 30 of FIG. 8, in conjunction with the extended log or cement footings, prevent backfill from falling into the interior of the waterway and causing stream damage. Curved arch opening 34 is constructed to have the identical arch diameter of the archway 2 in FIG. 2 and bolts onto the inner side of flange 6 of FIG. 1 or FIG. 3.

FIG. 9 illustrates a side view of headwall 26 and side support 30 for the headwall 26. FIG. 10 is a section view and illustrates top ledge 32 attached to the vertical surface 28 of headwall 26 which is in turn bolted to flange 6 of module 4 by bolts passing through holes 9 of flange 6 and holes 36 of headwall 26. The horizontal surface of the module 4 and flange 6 provide support of the flat surface of the headwall 26, and prevent the headwall 26 from buckling when earth is piled up against the headwall 26.

When bolts are installed in holes 36 of FIG. 8 and into holes 9 of adjacent archway flange 6 (see FIG. 10), the outer flange 6 of the archway provides additional support to the headwall 26. All headwalls have bolt patterns identical to the belt patterns of any flange side of the archway, thereby allowing for ease of installation. In areas where there are deep crossings, the use of headwalls as shown in FIG. 8 allows a higher build-up of the road crown, thus reducing the width of the crossing. A special headwall of higher profile may be used for extreme situations where the road crown height is abnormal. The horizontal top ledge 32 in FIG. 10 is permanently joined to side supports 30 in FIG. 9 at top ledge position 32 making the top ledge 32 in FIG. 8.

Advantages of the Invention

The "Enviro-Span" archway according to the invention has the following advantages:

(1) The archway modules according to the invention are pollution free. They are manufactured of fibreglass or a cement/fibreglass compositions which are compatible with the environment.

(2) The archway modules are lightweight. This is because the modules are manufactured in relatively small sections, and thus they may be handled manually, thereby reducing freight and labour costs.

(3) The archway modules are simple to assemble. Simplicity of assembly is achieved by using a log base which is easy to collect and install (other options such as concrete footings are available) and flanges on the adjacent modules which can be bolted together through pre-drilled holes. Only wrenches and bolts are required for assembly on site. The modules have identical sides (flanges) and bolt holes so any installer does not have to be concerned about left or right configurations of the modules. The use of logs as a "footing support base" of the "Enviro-Span" archway causes minimum disturbance of the waterway bed, compared to dredging the waterway bed.

(4) The archway modules by being constructed of a composite of cement and fibreglass, or fibreglass polyester, are long lasting and durable.

(5) The archway modules are adapted for ready attaching to headwalls. The modules have identical flanged ends that terminate the length of the archway, and fit the headwalls. Once the proper length of archway crossing is determined, the headwalls are bolted to the exposed flanges at the inlet and outlet sides of the archway.

(6) The archway, comprising assembled modules, is strong, yet inexpensive to make and install, compared to existing systems.

(7) The installed "Enviro-Span" archway can be readily reclaimed. If the roadway is decommissioned, the "Enviro-Span" archway can be easily and totally dismantled and used for another similar application at another site. This benefit provides a great cost saving over conventional systems. A typical wooden truss crossing is heavy and must be removed with the aid of large equipment such as cranes. A wooden truss is usually damaged when disassembled and must be hauled to a disposal or reclamation site. A similar problem exists with CSP type products. They are costly, particularly considering the fact that they are not normally reusable. CSP type products are not reusable because they do not comply with the new regulations. They must be completely removed to a reclamation site where they can be reclaimed by a salvage company or continue to rust and be of further danger to the environment. Due to the spiral construction of CSP, product removal without damage is not a very common occurrence.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An archway culvert construction comprising a plurality of modules, each module comprising:
   (a) a one-piece hollow semi-cylindrical body which has first and second ends, first and second bases and a radial arc of 180° ;
   (b) a first vertical flange on the first end of the semi-cylindrical body having bolt holes therein and extending the 180° periphery of the first end of the semi-cylindrical body;
   (c) a second vertical flange on the second end of the semi-cylindrical body having bolt holes therein and extending the 180° periphery of the second end of the semi-cylindrical body;
   (d) an integral semi-circular upstanding reinforcing rib on an exterior region of the semi-cylindrical body between the first flange and the second flange, said rib extending the 180° periphery of the semi-cylindrical body and being formed in one piece as part of the semi-cylindrical body;
   (e) a first footing contact area at the base of a first side of the semi-cylindrical body and extending the length of the body and contacting the bases of the body, the first flange, the second flange and the reinforcing rib;
   (f) a second footing contact area at the base of a second side of the semi-cylindrical body and extending the length of the body and contacting the bases of the body, the first flange, the second flange and the reinforcing rib on a side of the semi-cylindrical body opposite the first side; and
   said archway including a semi-circular hollow protective cap for fitting over the entirety of adjacent unbolted flanges of adjacent modules placed adjacent to one another, the semi-circular protective cap extending 180° on the exterior of the semi-cylindrical body from the first footing contact area to the second footing contact area, and thereby enabling the adjacent modules to move independent of one another.

2. A module as claimed in claim 1 wherein the first and second footing contact areas are semi-cylindrical and concave.

3. A module as claimed in claim 1 wherein the first and second footing contact areas are planar.

4. An archway constructed from at least three adjacent modules as claimed in claim I including bolts securing the flanges of two adjacent modules together, and including a second protective cap covering the entirety of the adjacent flanges and bolts.

5. An archway as claimed in claim 4, including a first headwall at a first end of the adjacent modules and a second headwall at a second opposite end of the adjacent modules.

6. An archway as claimed in claim 5 wherein the first and second headwalls are congruent with the curved flanges of the adjacent modules and are bolted to the flanges of the adjacent modules.

7. An archway as claimed in 1 comprising at least four adjacent modules and wherein some adjacent flanges of the modules are bolted together, and some adjacent flanges of the modules are not bolted together and the floating protective caps cover the entirety of adjacent flanges, including bolted and unbolted flanges, and enable the protective cap covered non-bolted adjacent flanges to move relative to one another.

8. An archway as claimed in claim 7 including a first headwall at a first end of the adjacent modules and a second headwall at a second opposite end of the adjacent modules.

9. An archway as claimed in claim 8 wherein the first and second headwalls are congruent with the curved flanges of the adjacent modules and are bolted to the flanges of the adjacent modules.

10. An archway as claimed in claim 1 wherein the first and second flanges are parallel with one another.

11. An archway as claimed in claim 1 wherein the first and second flanges are at an angle to one another.

12. An archway for creek and stream crossing construction constructed of a plurality of at least two adjacent modules each comprising:
   (a) a one-piece hollow axially extending elongated semi-cylindrical body which has first and second ends, first and second bases and a radial arc of 180°,
   (b) a first vertical flange on the first end of the semi-cylindrical body having bolt holes therein and extending the 180° periphery of the first end of the semi-cylindrical body;
   (c) a second vertical flange on the second end of the semi-cylindrical body having bolt holes therein and extending the 180° periphery of the second end of the semi-cylindrical body;
   (d) an integral reinforcing semicircular upstanding reinforcing rib on an exterior region of the semi-cylindrical body between the first flange and the second flange, said rib extending the 180° periphery and being formed in one piece as part of the semi-cylindrical body;
   (e) a first footing contact area at the base of a first side of the semi-cylindrical body and extending the length of the body and contacting the bases of the body, the first flange, the second flange and the reinforcing rib;
   (f) a second footing contact area at the base of a second side of the semi-cylindrical body and extending the length of the body and contacting the bases of the body, the first flange, the second flange and the reinforcing rib; and
   (g) a floating semi-circular hollow protective cap which fits over the entirety of the flanges of adjacent modules and enables the adjacent modules to move relative to one another.

13. An archway as claimed in claim 12, constructed from at least three adjacent modules including bolts securing the adjacent flanges of a first pair of adjacent modules together, and the floating protective cap covering the entirety of adjacent flanges of a second pair of adjacent modules and enabling the second pair of adjacent modules to move independent of one another, and bolts securing the contact areas to the footings, wherein there are at least three modules and some adjacent flanges are bolted together, and some adjacent flanges are not bolted together, but have protective caps over the flanges, and including a first headwall at a first end of the adjacent modules and a second headwall at a second end of the adjacent modules, and wherein the first and second headwalls are congruent with the curved flanges and are bolted to adjacent flanges of proximate modules.

* * * * *